United States Patent
Shinada et al.

[11] Patent Number: 5,519,599
[45] Date of Patent: May 21, 1996

[54] CONTROL OF SWITCHING DEVICES IN SYNCHRONIZED-RECTIFICATION SYSTEM

[75] Inventors: Yosuke Shinada; Sunao Hamamura, both of Tokyo, Japan

[73] Assignee: NEC Corporation, Japan

[21] Appl. No.: 385,351

[22] Filed: Feb. 8, 1995

[30] Foreign Application Priority Data

Jul. 27, 1994 [JP] Japan .................................. 6-174972

[51] Int. Cl.[6] .............................. H02M 3/335; G05F 1/40
[52] U.S. Cl. ................................................ 363/21; 323/282
[58] Field of Search ................................. 363/16, 20, 21, 363/95, 97, 127, 131; 323/222, 282

[56] References Cited

U.S. PATENT DOCUMENTS

| | | | |
|---|---|---|---|
| 4,523,265 | 6/1985 | Deprez | 363/21 |
| 5,128,603 | 7/1992 | Wolfel | 323/282 |
| 5,303,138 | 4/1994 | Rozman | 363/21 |
| 5,341,279 | 8/1994 | Yamada | 363/21 |
| 5,400,239 | 3/1995 | Caine | 363/67 |
| 5,418,704 | 5/1995 | Hua et al. | 363/21 |

*Primary Examiner*—Matthew V. Nguyen

[57] ABSTRACT

A DC-DC converter comprises a switching pulse generator for generating a plurality of switching pulse signals for operating a primary switch and a synchronized-rectifying circuit. The switching pulse generator generates the respective switching pulse signals having different pulse widths based on different control voltages which are generated by a voltage divider comprising a variable-impedance device. The pulse width of each switching pulse signal is set according to the differences between the control voltages. The switching pulse generator comprises a first control circuit for the primary switch and a second control circuit for the synchronized-rectifying circuit. Switching timing of the synchronized-rectifying circuit is deviated from that of the primary switch by a period corresponding to the difference between a certain control voltage and each of the other control voltages.

37 Claims, 10 Drawing Sheets

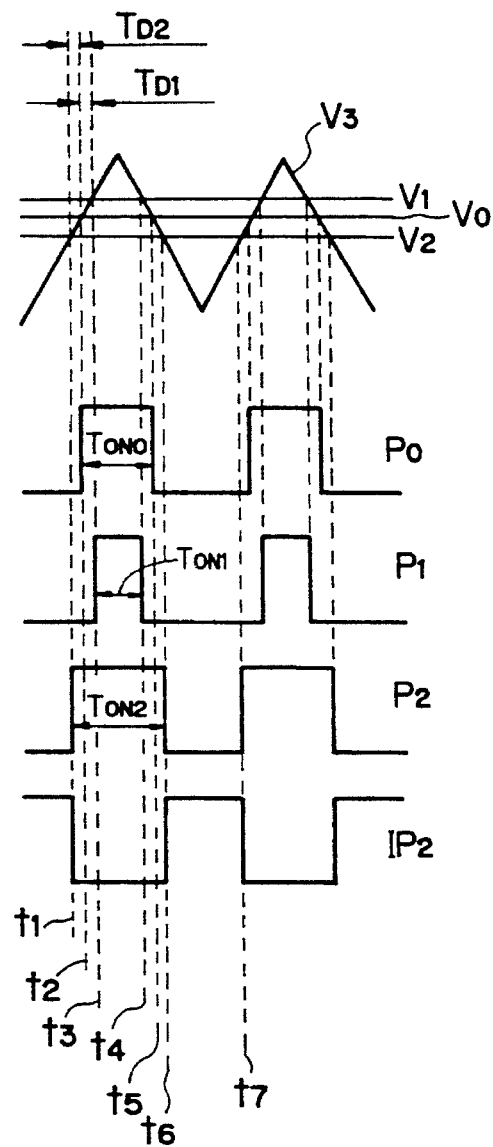
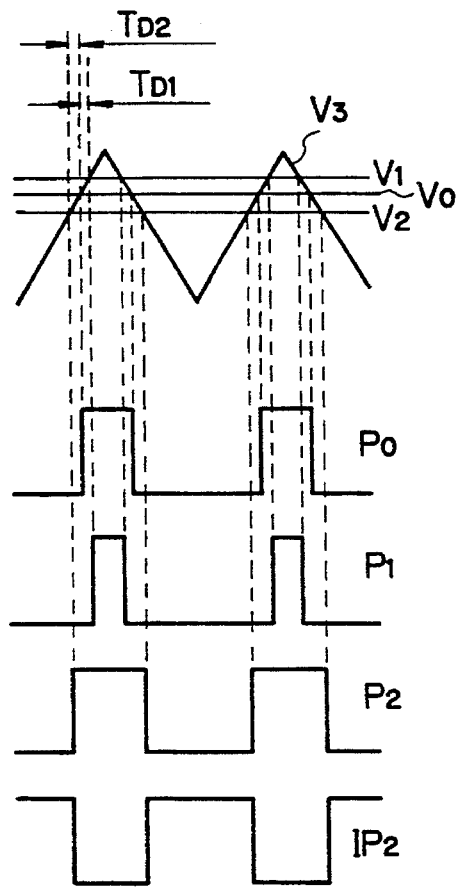

CONTROL OF SWITCHING DEVICES IN SYNCHRONIZED-RECTIFICATION SYSTEM

BACKGROUND OF THE INVENTION

1. Field of the Invention

The present invention relates to a DC-DC converter employing a synchronized-rectification system and, more specifically, to control of switching devices in the synchronized-rectification system.

2. Prior Art

With reduction of voltages supplied to integrated circuits, a small-sized converter capable of supplying a low voltage at high efficiency is now required. To provide such a converter, the synchronized-rectification system is widely employed in which a rectifying circuit is comprised of metal-oxide-semiconductor field-effect transistors (MOSFETs) which are caused to operate in synchronization with a primary switch of the converter.

FIG. 1 is a circuit diagram showing a conventional synchronized-rectification type converter. A MOSFET 1 as a primary switch is connected to the primary of a transformer TR. A rectifying circuit comprising a rectifying diode 2 and a flywheel MOSFET 3 is connected to the secondary of the transformer TR, and a smoothing circuit comprising a choke coil 4 and a capacitor 5 is connected to the rectifying circuit.

Monitoring a DC output voltage of the converter, a control circuit 6 controls the resistance of a variable-resistance device 7 in accordance with the level of the output voltage. The variable resistance device 7 and a resistor 8 are connected in series to each other to form a voltage divider, and divide a reference voltage $V_{ref}$ to form a control voltage $V_1$, which is input to a comparator 9. The comparator 9 compares the control voltage $V_1$ with a triangular-wave voltage that is output from a triangular-wave generator 10. A high-level voltage is applied to a gate of the MOSFET 1 and an inverter 11 when the triangular-wave voltage is not smaller than the control voltage $V_1$ and a low-level voltage is applied to them when the triangular-wave voltage is smaller than the control voltage $V_1$. An output of the inverter 11 is applied to a gate of the MOSFET 3. Therefore, the flywheel MOSFET 3 operates in synchronization with the MOSFET 1 such that one is in ON state when the other is in OFF state.

When the output voltage of the converter increases, the control circuit 6 decreases the resistance of the variable-resistance device 7, to thereby increase the control voltage $V_1$. As a result, the period during which the triangular-wave voltage is higher than the control voltage $V_1$ is shortened. In other words, the pulse width of a switching pulse that is output from the comparator 9 is shortened. Therefore, the MOSFET 1 as the primary switch operates to reduce the power transferred from the primary to the secondary of the transformer TR, to thereby decrease the output voltage of the converter. Conversely, when the output voltage of the converter decreases, the control circuit 6 increases the resistance of the variable-resistance device 7, to thereby decrease the control voltage $V_1$. As a result, the pulse width of the switching pulse that is output from the comparator 9 becomes longer, so that the output voltage of the converter is increased. In this manner, the output voltage level of the converter can be kept constant by controlling the ON-period of the MOSFET 1.

However, because of a delay in operation of the inverter 11 and a delay in operation resulting from the gate capacitance of the flywheel MOSFET 3, the operation timing of the flywheel MOSFET 3 inevitably delays from that of the MOSFET 1. As a result, in the conventional converter, there may occur a phenomenon that, in a high-frequency switching operation, the primary switch MOSFET 1 and the flywheel MOSFET 3 are rendered in ON state at the same time, resulting in reduced efficiency of the converter.

Even if a MOSFET is used in place of the rectifying diode 2 and is controlled by the switching pulse that is output from the comparator 9, the reduction in the efficiency still occurs. This is so because there occurs a period during which both of the rectifying MOSFET and the flywheel MOSFET 3 are rendered in ON state, and the secondary of the transformer TR is short-circuited during that period.

SUMMARY OF THE INVENTION

An object of the present invention is to provide a high-efficiency DC-DC converter.

Another object of the invention is to provide a control method of switching devices in a synchronized-rectifying circuit in order not to reduce the efficiency of a DC-DC converter.

A further object of the invention is to provide a switching regulator which can maintain a high efficiency even when power supply input conditions and/or load conditions vary.

A DC-DC converter according to the present invention is comprised of a switching pulse generator for generating a plurality of switching pulse signals for operating a primary switch and a synchronized-rectifying circuit. The switching pulse generator generates the respective switching pulse signals having different pulse widths based on different control voltages which are generated by a voltage divider comprising a variable-impedance device. The pulse width of each switching pulse signal is set according to the differences between the control voltages.

More specifically, the switching pulse generator is comprised of a first control circuit and second control circuit. The first control circuit controls a switching operation of the primary switch based on a single control voltage among the plurality of control voltages such that the DC output voltage is kept constant. The second control circuit controls a switching operation of the synchronized-rectifying circuit based on each of the other control voltages such that switching timing of the synchronized-rectifying circuit is deviated from that of the primary switch by a period corresponding to the difference between the single control voltage and each of the other control voltages.

The control voltages are preferably generated by a control voltage generator is comprised of a variable-impedance device for varying in impedance in accordance with the DC output voltage of the DC-DC converter, and a plurality of level-shift elements connected in series to each other, each level-shift elements causing a voltage drop. The series level-shift elements are connected in series to the variable-impedance device.

Preferably, each level-shift element is comprised of a bipolar transistor operating in a saturation region, resulting in higher stability.

The first control circuit is preferably comprised of a triangular-wave generator for generating a triangular-wave voltage signal of a predetermined frequency, and a first comparator for comparing the single control voltage with the triangular-wave voltage signal to output a switching pulse signal for operating the primary switch, the switching pulse signal having a pulse width equal to a period during which the single control voltage is smaller than the triangular-wave voltage signal.

3

The second control circuit is preferably comprised of a second comparator for comparing each of the other control voltages with the triangular-wave voltage signal to output a switching pulse signal for operating the synchronized-rectifying circuit, the switching pulse signal having a pulse width equal to a period during which each of the other control voltages is smaller than the triangular-wave voltage signal.

BRIEF DESCRIPTION OF THE DRAWINGS

FIG. 6A is a waveform diagram showing an operation of the third embodiment;

FIG. 6B is a waveform diagram showing an operation of the third embodiment when an output voltage increases;

DESCRIPTION OF THE PREFERRED EMBODIMENTS

Figure 1:
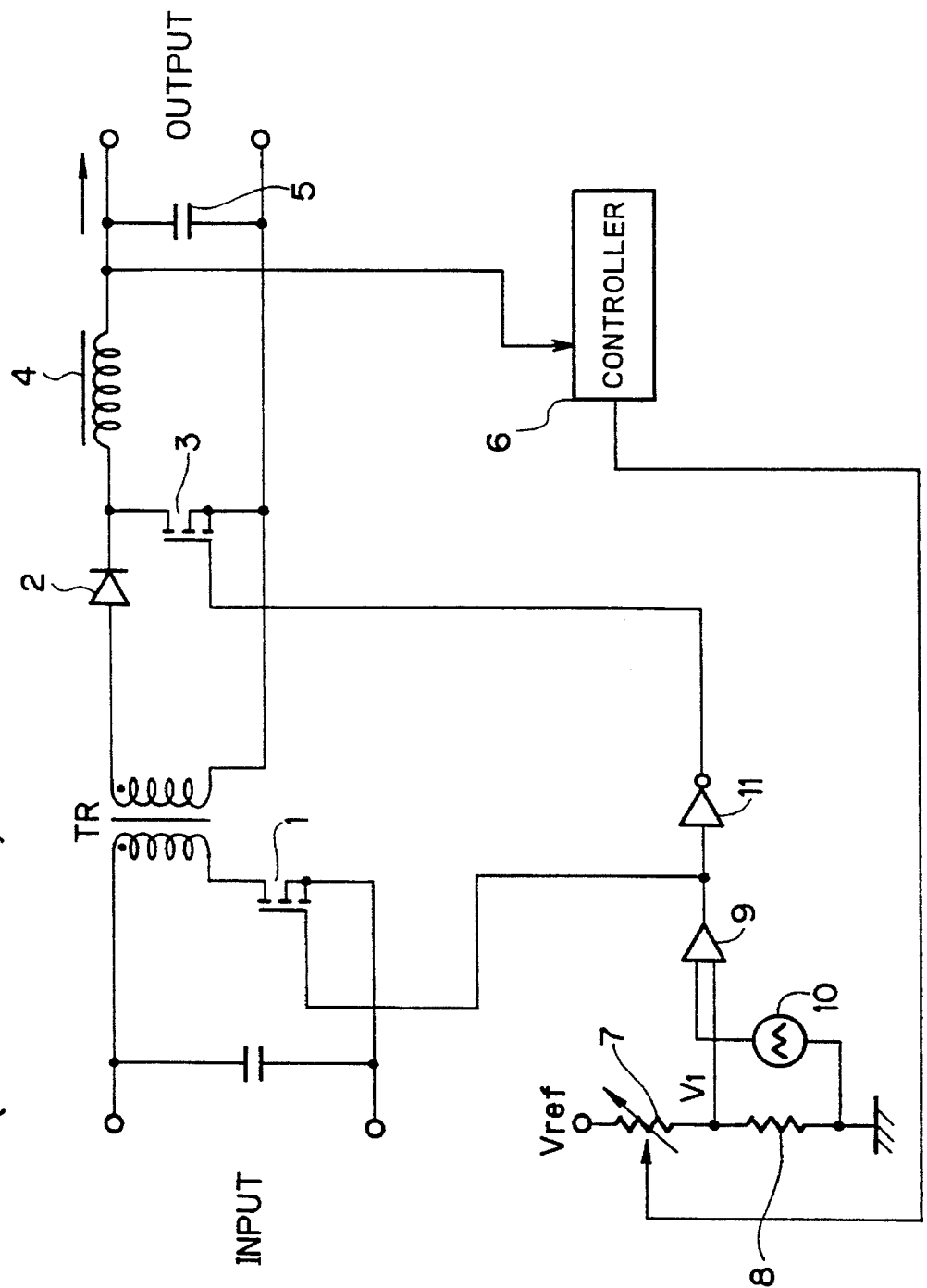
FIG. 1 is a circuit diagram showing a conventional switching regulator.
Figure 2:
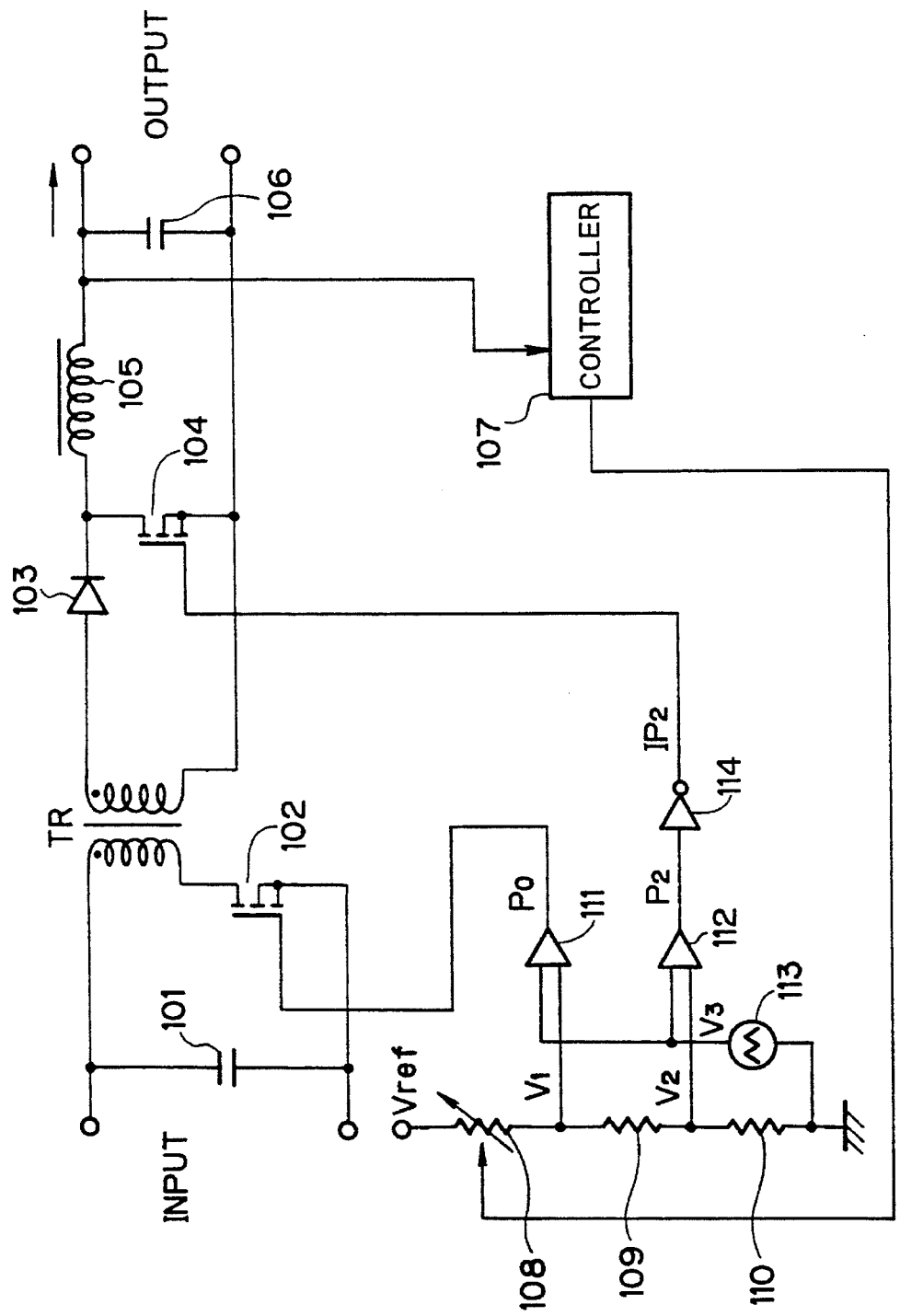
FIG. 2 is a circuit diagram showing a switching regulator according to a first embodiment of the present invention.

As shown in FIG. 2, an input capacitor 101 and a primary switch MOSFET 102 are connected to the primary of a transformer TR. A rectifying circuit comprising a rectifying diode 103 and a flywheel MOSFET 104 is connected to the secondary of the transformer TR, and a smoothing circuit comprising a choke coil 105 and a capacitor 106 is connected to the rectifying circuit.

Monitoring a DC output voltage of the converter, a control circuit 107 controls the resistance of a variable-impedance device 108 in accordance with the level of the DC output voltage. The variable-impedance device 108 and resistors 109 and 110 are connected in series to each other to form a voltage divider, and divide a reference voltage $V_{ref}$ to form control voltages $V_1$ and $V_2$. The respective control voltages $V_1$ and $V_2$ are expressed as $$V_1 = V_{ref}(R_{108}+R_{109})/(R_{108}+R_{109}+R_{110})$$

and $$V_2 = V_{ref} R_{109}/(R_{108}+R_{109}+R_{110}),$$

where $R_{108}$, $R_{109}$ and $R_{110}$ are resistances of the variable-impedance device 108 and resistors 109 and 110, respectively. Therefore, when the resistance $R_{108}$ of the variable-impedance device 108 varies, the control voltages $V_1$ and $V_2$ are changed while always maintaining a relationship $V_1 > V_2$.

4

The variable-impedance device 108, which is controlled by the control circuit 107, can be realized as a photocoupler as described later.

The control voltages $V_1$ and $V_2$ are respectively input to comparators 111 and 112, where they are compared with a triangular-wave voltage $V_3$ that is output from a triangular-wave generator 113. The comparator 111 supplies a gate of the MOSFET 102 with a switching pulse $P_0$ whose voltage level is high when the triangular-wave voltage is not smaller than the control voltage $V_1$ and is low when the former is smaller than the latter. The comparator 112 supplies an inverter 114 with a switching pulse $P_2$ whose voltage level is high when the triangular-wave voltage is not smaller than the control voltage $V_2$ and is low when the former is lower than the latter. An output $IP_2$ of the inverter 114 is applied to a gate of the flywheel MOSFET 104. As in the conventional case, the output voltage level of the converter can be kept constant, because the pulse width of the switching pulse $P_0$ is controlled by the control circuit 107.

Figure 3:
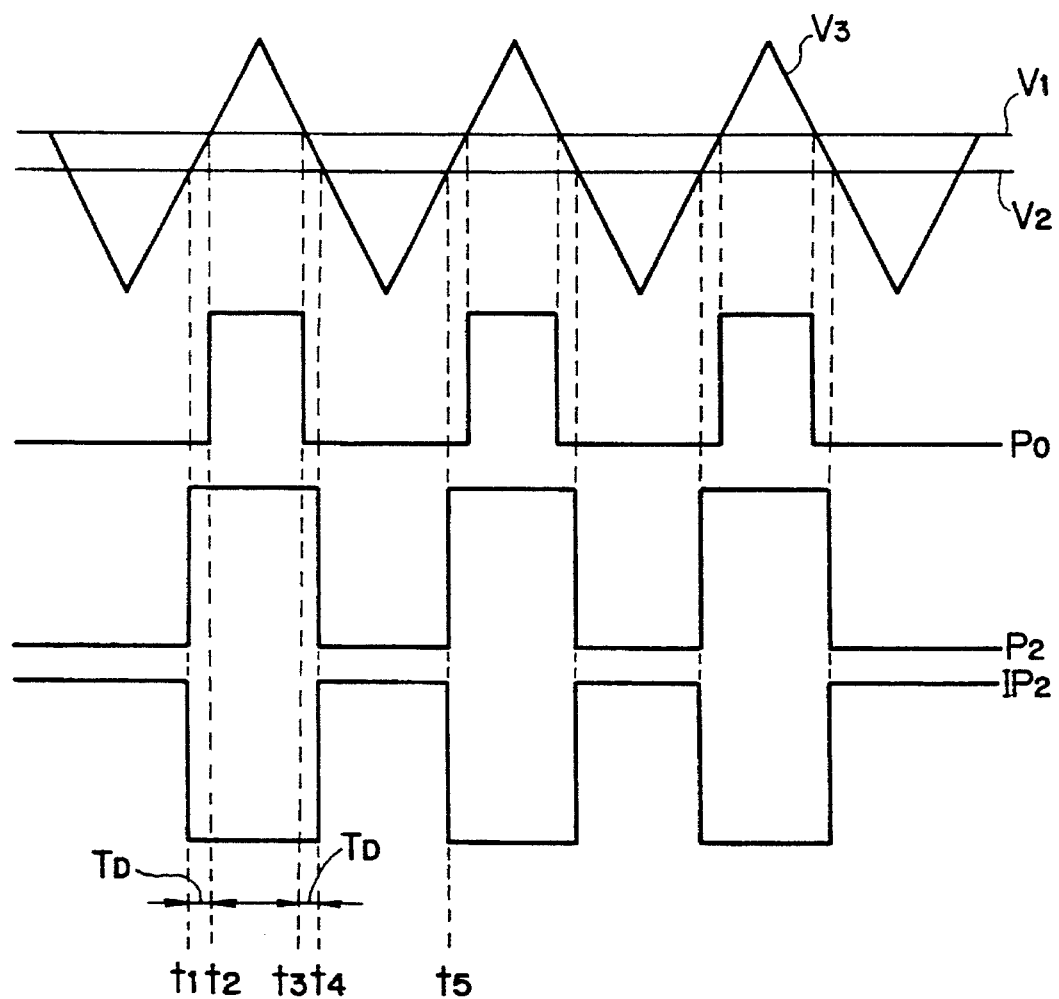
FIG. 3 is a waveform diagram showing an operation of the first embodiment.

As shown in FIG. 3, the comparator 111 outputs the switching pulse $P_0$ to the MOSFET 102 by comparing the control voltage $V_1$ with the triangular-wave voltage $V_3$. The pulse width $t_2-t_3$ of the switching pulse $P_0$ is substantially equal to a period during which the triangular-wave voltage $V_3$ is higher than the control voltage $V_1$. Therefore, when the resistance $R_{108}$ of the variable-impedance device 108 is increased/decreased by the control circuit 107, the control voltage $V_1$ decreases/increases and, as a result, the pulse width of the switching pulse $P_0$ that is output from the comparator 111 increases/decreases.

Since, as described above, the control voltage $V_1$ is always higher than the control voltage $V_2$, a pulse width $t_2-t_3$ of the switching pulse $P_0$ that is output from the comparator 111 is always shorter than a pulse width $t_1-t_4$ of the switching pulse $P_2$ that is output from the comparator 112. Therefore, a rise instance $t_2$ of the switching pulse $P_0$ is delayed from a rise instance $t_1$ of the switching pulse $P_2$, and a fall instance $t_4$ of the switching pulse $P_2$ is delayed from a fall instance $t_3$ of the switching pulse $P_0$. Since the switching pulse $P_0$ causes the MOSFET 102 to be in ON state and the switching pulse $IP_2$ causes the flywheel MOSFET 104 to be in ON state, each of periods $t_1-t_2$ and $t_3-t_4$ is a dead period $T_D$ during which both MOSFETs 102 and 104 are in OFF state. The length of the dead period $T_D$ may be so set as to be able to absorb a delay including a delay in the operation of the inverter 114 and a delay in the switching operation of the MOSFET 104 due to its gate capacitance. The length of the dead period $T_D$ can easily be set by properly selecting the resistances $R_{109}$ and $R_{110}$.

Since, as shown in FIG. 3, the flywheel MOSFET 104 is switched to the OFF state at the time instance $t_1$ that is previous, by the dead period $T_D$, to the time instance $t_2$ when the primary switch MOSFET 102 is turned on, it is completely turned off even if the above delay occurs in the dead period $t_1 14 t_2$. Thus, there can be avoided an event that both MOSFETs 102 and 104 are rendered in the ON state at the same time.

On the other hand, when the MOSFET 102 is switched to the OFF state at the time instance $t_3$, a parasitic diode in the flywheel MOSFET 104 is turned on, causing a load current to flow. As a result, there occur losses such as a conduction loss at the dead period $t_3-t_4$, resulting in a reduction of the efficiency. Therefore, it is necessary to set the dead period $T_D$ as short as possible within the range of not causing simultaneous turning on of the MOSFETs 102 and 104. During a period from $t_4$ to $t_5$, energy stored in the coil 105 is supplied to the load because the flywheel MOSFET 104 is in the ON state.

Figure 4:
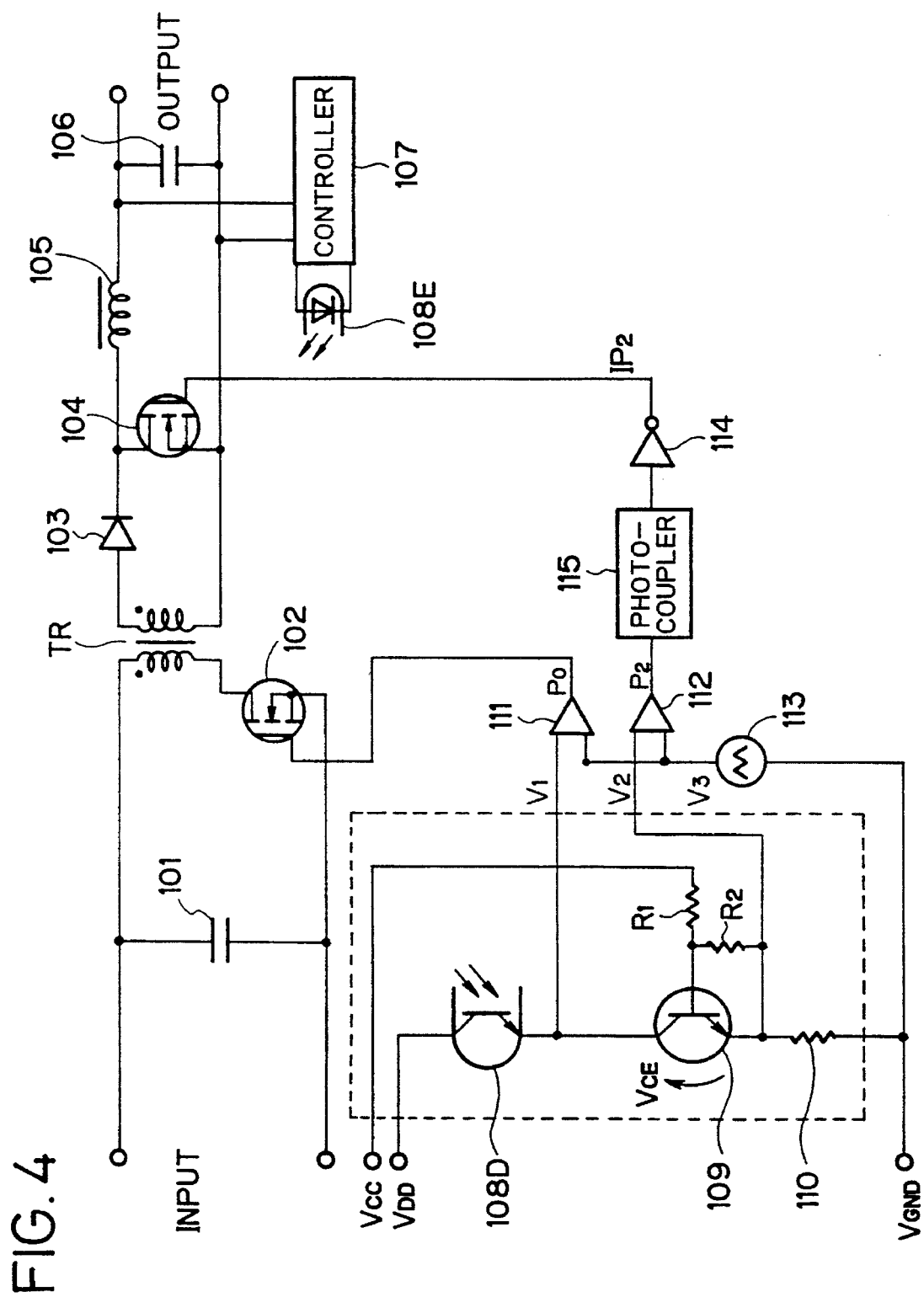
FIG. 4 is a circuit diagram showing a switching regulator according to a second embodiment of the invention.

FIG. 4 shows a second embodiment of the invention. While this embodiment basically has the same configuration as the first embodiment of FIG. 2, the former is different from the latter in the following two points. First, the primary and the secondary circuits of the transformer TR are insulated from each other by photocouplers 108 and 115. Second, to generate the control voltages $V_1$ and $V_2$, a level-shift transistor 109 is used instead of a resistor.

The control circuit 107 changes a light quantity emitted from a light-emitting diode 108E of the photocoupler 108 in accordance with the DC output voltage of the converter, and the impedance of a photodetector 108D of the photocoupler 108 varies in accordance with the light quantity received from the light-emitting diode 108E. A power supply voltage $V_{CC}$ and resistances $R_1$ and $R_2$ are so set that an NPN transistor 109 that is connected in series to the photodetector 108D operates in a saturation region. Therefore, a difference (level-shift amount) between the control voltages $V_1$ and $V_2$ becomes equal to a collector-emitter saturation voltage $V_{CE}$ of the NPN transistor 109, and is always kept constant irrespective of the impedance variation of the photodetector 108D. Thus, the dead period $T_D$ (see FIG. 3) of the switching pulses which period is determined by the difference between the control voltages $V_1$ collector-emitter saturation voltage $V_{CE}$ of the NPN transistor and $V_2$ can always be kept constant with high accuracy. The 109 can be set by the resistances $R_1$ and $R_2$ of the bias circuit.

Figure 5:
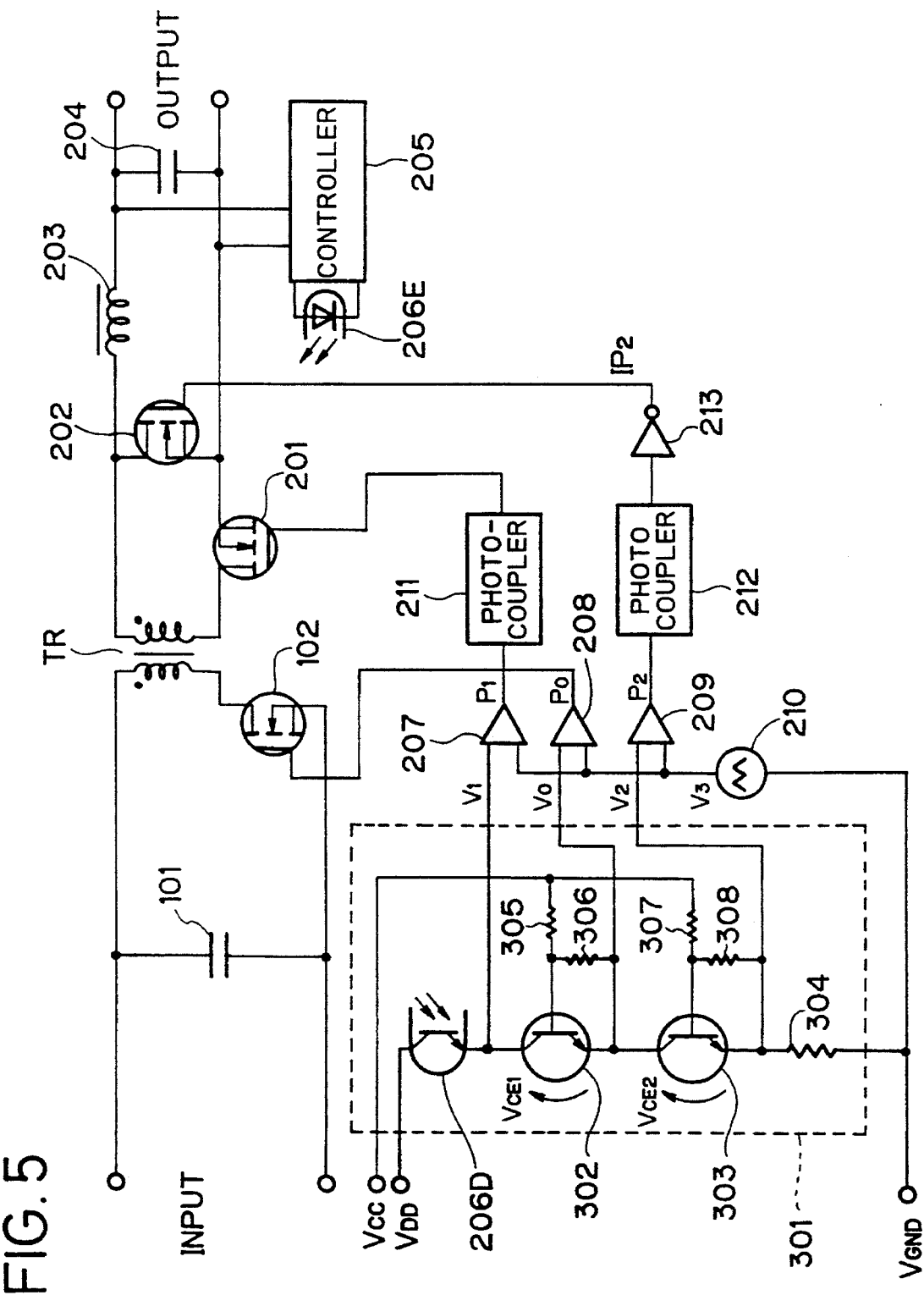
FIG. 5 is a circuit diagram showing a switching regulator according to a third embodiment of the invention.

FIG. 5 shows a third embodiment of the invention, which is a forward converter employing a synchronized-rectifying circuit comprising a rectifying MOSFET 201 and a flywheel MOSFET 202. As in the case of the above embodiments, the primary circuit of the transformer TR is comprised of the input capacitor 101 and the primary switch MOSFET 102. The rectifying MOSFET 201 and the flywheel MOSFET 202 are connected to the secondary of the transformer TR, and a smoothing circuit comprising a choke coil 203 and a capacitor 204 is connected to the rectifying circuit.

Monitoring a DC output voltage of the converter, a control circuit 205 controls the light quantity emitted from a light-emitting diode 206E of a photocoupler 205 in accordance of the level of the DC output voltage. A variation of the light emission amount is converted to an impedance variation by a photodetector 206D of the photocoupler 206. In accordance with the impedance variation of the photodetector 206D, a pulse generator 301 generates control voltages $V_1$, $V_0$ and $V_2$ ($V_1 > V_0 > V_2$), which are input to comparators 207–209, respectively. The comparators 207–209 respectively compare the control voltages $V_1$, $V_0$ and $V_2$ with a triangular-wave voltage $V_3$ that is output from a triangular-wave generator 210, and generate switching pulses $P_1$, $P_0$ and $P_2$ by outputting high-level voltages only while the triangular-wave voltage $V_3$ is not smaller than the respective control voltages. The switching pulse $P_1$ is applied to the gate of the rectifying MOSFET 201 via a photocoupler 211 as an insulation circuit. The switching pulse $P_0$ is applied to the gate of the primary switch MOSFET 102. The switching pulse $P_2$ is supplied to an inverter 213 via a photocoupler 212 as an insulation circuit. A switching pulse $IP_2$, i.e., an output of the inverter 213 is applied to the gate of the flywheel MOSFET 202.

The pulse generator 301 has the following configuration. The photodetector 206D of the photocoupler 206, level-shift NPN transistors 302 and 303, and a resistor 304 are connected in series to each other. A power supply voltage $V_{DD}$ is applied to this series circuit, and the resistor 304 is connected to a reference voltage $V_{GND}$. A bias circuit comprising resistors 305 and 306 is connected to the base of the NPN transistor 302 and, similarly, a bias circuit comprising resistors 307 and 308 is connected to the base of the NPN transistor 303. The resistances of the respective bias circuits are set such that the NPN transistors 302 and 303 operate in a saturation region when the power supply voltages $V_{DD}$ and $V_{CC}$ are applied. The control voltage $V_1$ is a collector voltage of the NPN transistor 302, the control voltage $V_0$ is a collector voltage of the NPN transistor 303, and the control voltage $V_2$ is an emitter voltage of the NPN transistor 303. Since the NPN transistors 302 and 303 operate in a saturation region, collector-emitter voltages $V_{CE1}$ and $V_{CE2}$ of the respective transistors are kept constant, to provide the following relationship among the three control voltages:

$$V_1 = V_0 + V_{CE1} > V_0 > V_2 = V_0 - V_{CE2}.$$

Therefore, the pulse widths $T_{ON1}$, $T_{ON0}$ and $T_{ON2}$ of the switching pulses that are output from the respective comparators 207–209 have a relationship $T_{ON1} < T_{ON0} < T_{ON2}$, and fixed time differences therebetween are generated corresponding to the collector-emitter voltages $V_{CE1}$ and $V_{CE2}$.

Referring to FIGS. 6A and 6B, an operation of this embodiment will be described in further detail. It is assumed that the control circuit 205 has controlled the photodetector 206D via the light-emitting diode 206E so that the photodetector 206D has a certain impedance. The control voltage $V_1$ is generated by a voltage drop across this photodetector 206D. The control voltage $V_0$ is generated by a further voltage drop of the collector-emitter voltage $V_{CE1}$ of the NPN transistor 302 which operates in a saturation region. The control voltage $V_2$ is generated by a still further voltage drop of the collector-emitter voltage $V_{CE2}$ of the NPN transistor 303 which operates in a saturation region. Therefore, as shown in FIG. 6A, the three control voltages maintain the fixed relationship as follows: $V_1 = V_0 + V_{CE1} > V_0 > V_2 = V_0 - V_{CE2}$.

The control voltage $V_1$ and the triangular-wave voltage $V_3$ are compared with each other by the comparator 207, so that the switching pulse $P_1$ to be used for controlling the rectifying MOSFET 201 is generated. The control voltage $V_2$ and the triangular-wave voltage $V_3$ are compared with each other by the comparator 208, so that the switching pulse $P_0$ to be used for controlling the primary switch MOSFET 102 is generated. The control voltage $V_2$ and the triangular-wave voltage $V_3$ are compared with each other by the comparator 209, so that the switching voltage $P_2$ to be used for controlling the flywheel MOSFET 202 is generated. Therefore, as shown in FIG. 6A, the respective pulse widths $T_{ON1}$, $T_{ON0}$ and $T_{ON2}$ of the switching pulses $P_1$, $P_0$ and $P_2$ have the relationship: $T_{ON1} < T_{ON0} < T_{ON2}$. A time difference $T_{D1}$ between leading edge time instances and between trailing edge time instances of the switching pulses $P_1$ and $P_0$ is determined by the collector-emitter voltage $V_{CE1}$ of the NPN transistor 302, and a time difference $T_{D2}$ between leading edge time instances and between trailing edge time instances of the switching pulses $P_0$ and $P_2$ is determined by the collector-emitter voltage $V_{CE2}$ of the NPN transistor 303. $T_{D1} + T_{D2}$ is a dead period during which the MOSFETs 201 and 202 are in OFF state, and $T_{D2}$ is a dead period during which all the MOSFETs are in OFF state. As already described, the setting of the dead periods $T_{D1}$ and $T_{D2}$ is important in preventing short-circuiting and reducing conduction losses.

The rectifying operation of this embodiment will be described briefly. In FIG. 6A, in a period $t_2$–$t_3$, since the primary switch MOSFET 102 is in the ON state and the MOSFETs 201 and 202 of the secondary side are in the OFF state, a current flows in the secondary circuit through a parasitic diode in the MOSFET 201. In a subsequent period $t_3$–$t_4$, since the rectifying MOSFET 201 is in the ON state, a regular load current flows through the MOSFET 201. In a period $t_4$–$t_5$, since the MOSFET 201 is in the OFF state, again a current flows in the secondary circuit through the parasitic diode in the MOSFET 201. In a period $t_5$–$t_6$, since all the MOSFETs are in OFF state, energy stored in the coil 203 is released through a parasitic diode in the MOSFET 202. Then, in a period $t_6$–$t_7$, since the flywheel MOSFET 202 is in the ON state, a regular load current flows through the coil 203 and the MOSFET 202.

In this embodiment, by setting the dead periods $T_{D1}$ and $T_{D2}$ at optimum values, the delay in operation due to interposition of the photocouplers 211 and 212 and the inverter 213, and due to the gate capacitances of the MOSFETs 201 and 202 are absorbed by those dead periods. As a result, short-circuiting can be prevented and conduction losses can be reduced. More specifically, the flywheel MOSFET 202 is turned off at time $t_1$, i.e., before the primary switch MOSFET 102 is turned on at time $t_2$, and the rectifying MOSFET 201 is turned on at time $t_3$, i.e., after the MOSFET 102 is turned on at time $t_2$. Further, the rectifying MOSFET 201 is turned off at time $t_4$, i.e., before the MOSFET 102 is turned off at time $t_5$, and the flywheel MOSFET 202 is turned on at time $t_6$, i.e., after the MOSFET 102 is turned off at time $t_5$. By setting the collector-emitter voltages $V_{CE1}$ and $V_{CE2}$ of the respective NPN transistors 302 and 303 so as to establish a relationship $T_{D1}$, $T_{D2} \geq T_{DLY}$ ($T_{DLY}$ is a delay in operation of the secondary-side MOSFETs 201 and 202 with respect to the operation of the primary-side MOSFET 102), there can be prevented losses due to a delay in operation that may occur when the MOSFETs 201 and 202 are switched to the OFF state. Further, by establishing a relationship $T_{D1}$, $T_{D2} = T_{DLY}$, losses due to a delay in operation that may occur when the MOSFETs 201 and 202 are switched to the ON state can be minimized. The collector-emitter voltages $V_{CE1}$ and $V_{CE2}$ of the respective NPN transistors 302 and 303 can easily be set by properly setting the resistances of the resistors 305–308 of the bias circuits.

In particular, in this embodiment, since the differences between the control voltages $V_1$, $V_0$ and $V_2$ which differences determine the dead periods $T_{D1}$ and $T_{D2}$ are generated based on the collector-emitter voltages $V_{CE1}$ and $V_{CE2}$ of the NPN transistors 302 and 303 operating in a saturation region, the optimum dead periods can always be maintained even when the converter input conditions or load conditions are varied. For example, as shown in FIG. 6B, when the DC output voltage of the converter increases and the control circuit 205 decreases the impedance of the photodetector 206D of the photocoupler 206, the control voltage $V_0$ increases. Therefore, the pulse width of the switching pulse $P_0$ for causing the primary switch MOSFET 102 to be turned on is shortened and, as a result, the DC output voltage of the converter is decreased. In this manner, the DC output voltage can always be kept constant. In the above operation, although the control voltages $V_1$ and $V_2$ also increase, the dead periods $T_{D1}$ and $T_{D2}$ are always kept constant because the voltages $V_1$, and $V_2$ increase while maintaining their differences from the control voltage $V_0$, i.e., the collector-emitter voltages $V_{CE1}$ and $V_{CE2}$ of the NPN transistors 302 and 303.

Figure 7:
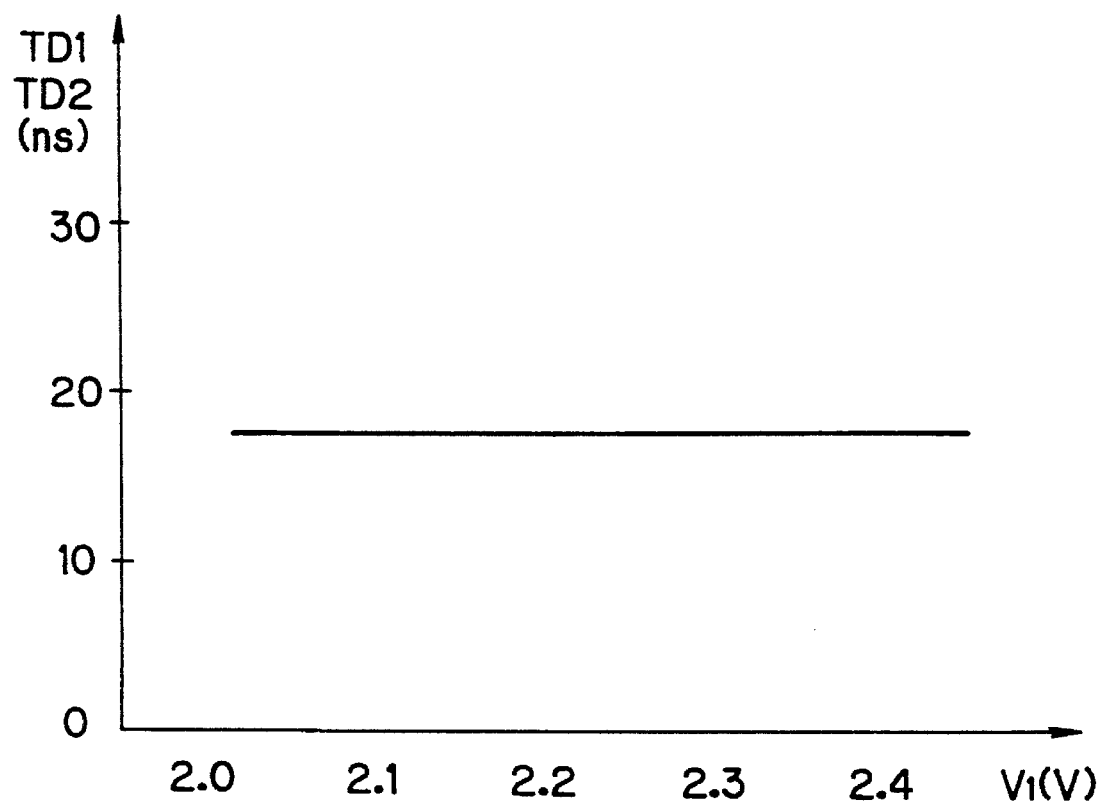
FIG. 7 is a graph showing a variation of dead periods with respect to a control voltage.

In this embodiment, as shown in FIG. 7, the dead periods $T_{D1}$ and $T_{D2}$ do not vary with respect to the control voltage $V_1$, where in the converter the DC input voltage is 48 V, DC output voltage is 3.3 V, DC output current is 3.6 A, the switching frequency is 300 Hz, and the input capacitance and ON-resistance of the MOSFETs are 1,200 pF and 45 mΩ, respectively.

Figure 8:
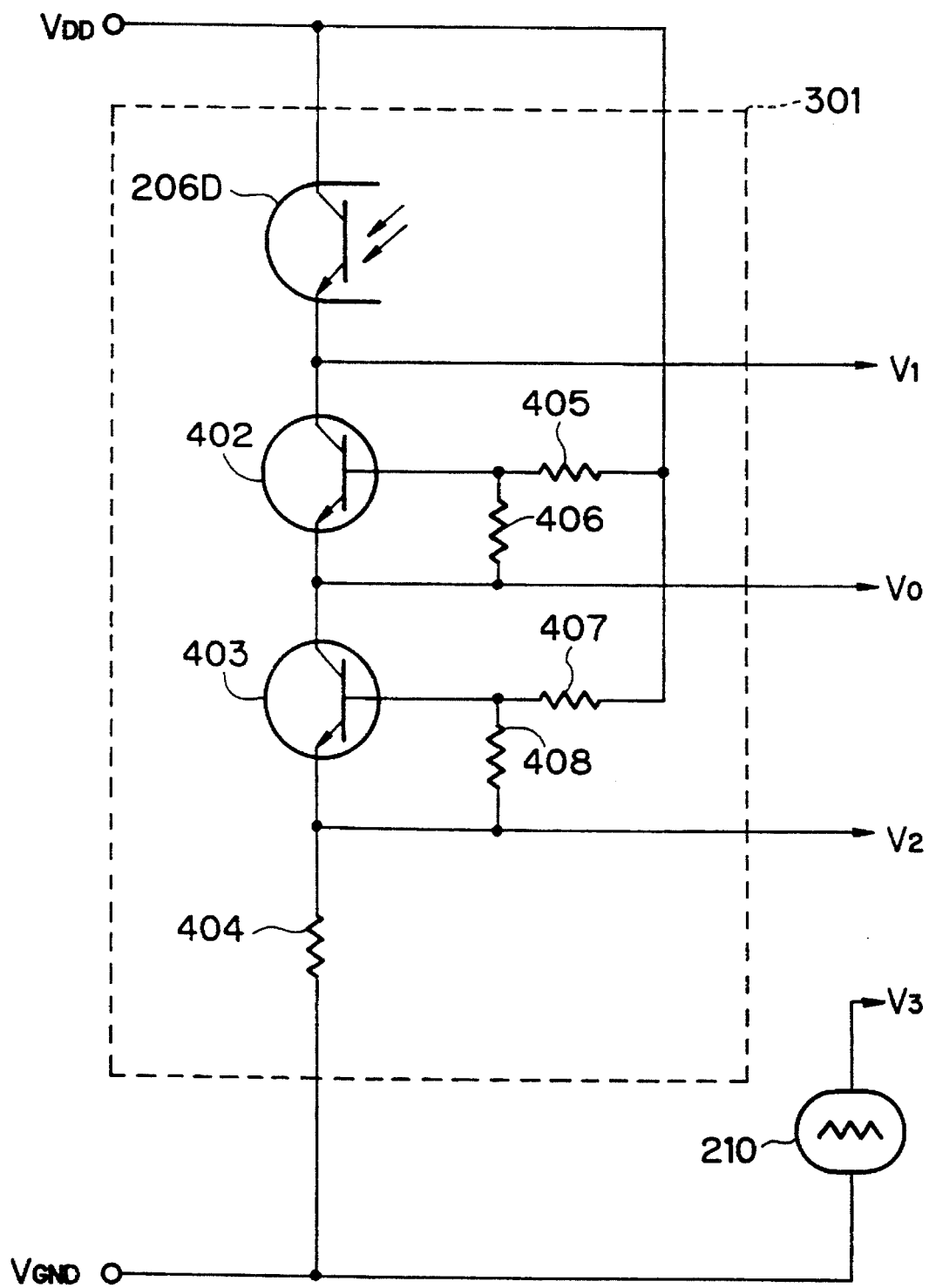
FIG. 8 is a circuit diagram showing a switching pulse generator according to a fourth embodiment of the invention.

The configuration of the switching pulse generator is not limited to the one (denoted by reference numeral 301) shown in FIG. 5. For example, in a configuration shown in FIG. 8, level-shift NPN transistors 402 and 403 and a resistor 404 are connected in series to the photodetector 206D, a bias circuit comprising resistors 405 and 406 is connected to the base of the transistor 402, and a bias circuit comprising resistors 407 and 408 is connected to the base of the transistor 403. Bias voltages to cause the transistors 402 and 403 to operate in a saturation region are generated by using a power supply voltage $V_{DD}$ for generating the control voltages. Such a configuration advantageously requires the single power supply voltage $V_{DD}$ only.

Figure 9:
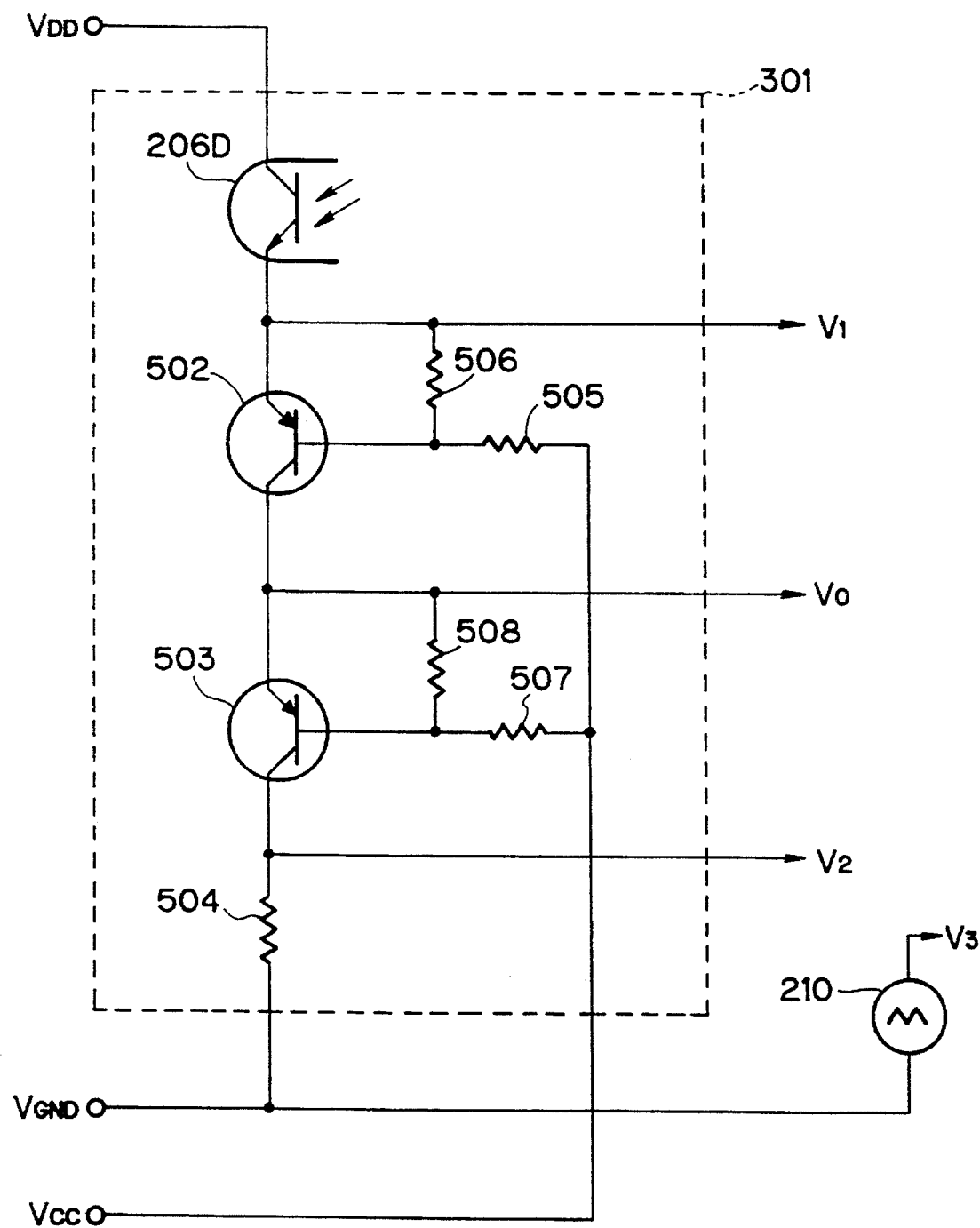
FIG. 9 is a circuit diagram showing a switching pulse generator according to a fifth embodiment of the invention.

The level-shift transistors are not limited to NPN transistors. For example, as shown in FIG. 9, PNP transistors may be caused to operate similarly in a saturation region. That is, level-shift PNP transistors 502 and 503 and a resistor 504 are connected in series to the photodetector 206D, a bias circuit comprising resistors 505 and 506 is connected to the base of the transistor 502, and a bias circuit comprising resistors 507 and 508 is connected to the base of the transistor 503. To cause the transistors 502 and 503 to operate in a saturation region, a separate power supply voltage $V_{CC}$ is applied to the respective bias circuits.

Figure 10:
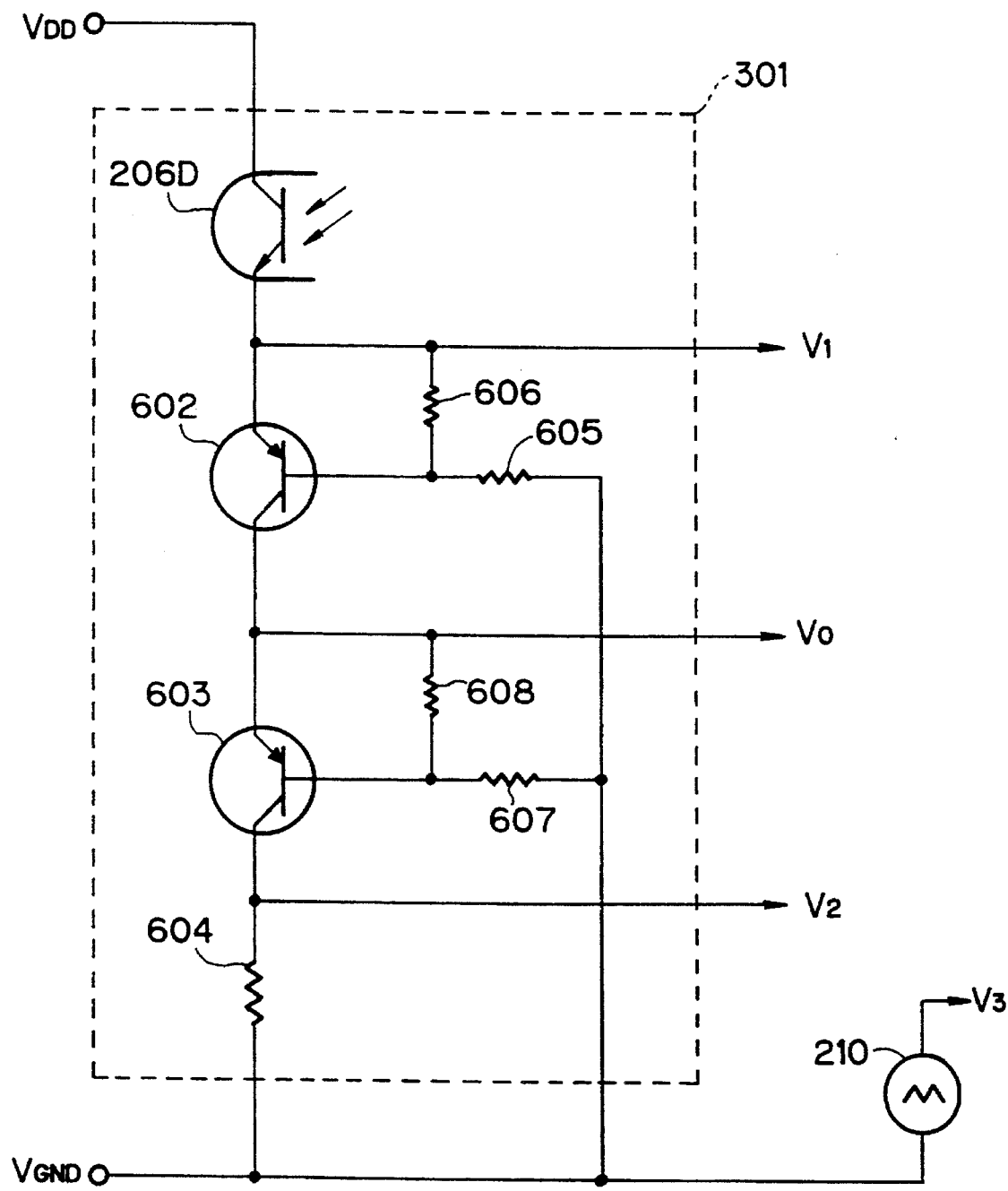
FIG. 10 is a circuit diagram showing a switching pulse generator according to a sixth embodiment of the invention.

Further, in a configuration shown in FIG. 10, level-shift PNP transistors 602 and 603 and a resistor 604 are connected in series to the photodetector 206D, a bias circuit comprising resistors 605 and 606 is connected to the base of the transistor 602, and a bias circuit comprising resistors 607 and 608 is connected to the base of the transistor 603. Bias voltages to cause the transistors 602 and 603 to operate in a saturation region are generated by using a power supply voltage $V_{DD}$.

We claim:

1. A DC-DC converter comprising:

transferring means transferring an electrical energy from a power supply to a load;

switching means performing a switching operation to supply the electrical energy to the transferring means;

synchronized-rectifying means performing a switching operation to rectify an output of the transferring means in synchronization with the switching operation of the switching means;

control voltage generating means generating a plurality of different control voltages in accordance with a DC output voltage of the DC-DC converter, the control voltages changing in predetermined voltage steps;

first control means controlling the switching operation of the switching means based on a single control voltage among the plurality of control voltages such that the DC output voltage is kept constant; and second control means controlling the switching operation of the synchronized-rectifying means based on each of the other control voltages such that switching timing of the synchronized-rectifying means is deviated from that of the switching means by a period corresponding to the difference between the single control voltage and each of the other control voltages.

2. The DC-DC converter as set forth in claim 1, wherein the control voltage generating means comprises:

variable-impedance means varying in impedance in accordance with the DC output voltage of the DC-DC converter; and a plurality of level-shift means connected in series, each level-shift means causing a voltage drop, and the plurality of level-shift means being connected in series with the variable-impedance means.

3. The DC-DC converter as set forth in claim 2, wherein the variable-impedance means comprises:

a photodetector incorporated in a photocoupler; and third control means controlling a light quantity of a light-emitting element incorporated in the photocoupler in accordance with the DC output voltage of the DC-DC converter.

4. The DC-DC converter as set forth in claim 2, wherein each level-shift means comprises a resistor.

5. The DC-DC converter as set forth in claim 2, wherein each level-shift means comprises a bipolar transistor operating in a saturation region.

6. The DC-DC converter as set forth in claim 3, wherein each level-shift means comprises a bipolar transistor operating in a saturation region.

7. The DC-DC converter as set forth in claim 1, wherein the first control means comprises:

triangular-wave generating means generating a triangular-wave voltage signal of a predetermined frequency; and first comparison means comparing the single control voltage with the triangular-wave voltage signal to output a switching pulse signal for operating the switching means, the switching pulse signal having a pulse width equal to a period during which the single control voltage is smaller than the triangular-wave voltage signal.

8. The DC-DC converter as set forth in claim 7, wherein the second control means comprises:

second comparison means comparing each of the other control voltages with the triangular-wave voltage signal to output a switching pulse signal for operating the synchronized-rectifying means, the switching pulse signal having a pulse width equal to a period during which each of the other control voltages is smaller than the triangular-wave voltage signal.

9. A switching regulator comprising a primary switch and a synchronized-rectifying circuit operating in synchronization with a switching operation of the primary switch, the synchronized-rectifying circuit comprising a flywheel switching device, the switching regulator further comprising:

control voltage generating means generating a first control voltage and a second control voltage lower than the first control voltage, in accordance with a DC output voltage of the switching regulator;

first control means controlling the switching operation of the primary switch based on the first control voltage such that the DC output voltage is kept constant;

second control means controlling a switching operation of the flywheel switching device based on the second control voltage such that switch-off timing of the flywheel switching device precedes switch-on timing of the primary switch and switch-on timing of the flywheel switching device follows switch-off timing of the primary switch by a period corresponding to the difference between the first and second control voltages.

10. The switching regulator as set forth in claim 9, wherein the control voltage generating means comprises:

variable-impedance means varying in impedance in accordance with the DC output voltage of the switching regulator; and two level-shift means connected in series, each level-shift means causing a voltage drop, and the two level-shift means being connected in series with the variable-impedance means.

11. The switching regulator as set forth in claim 10, wherein the variable-impedance means comprises:

a photodetector incorporated in a photocoupler; and third control means controlling a light quantity of a light-emitting element incorporated in the photocoupler in accordance with the DC output voltage of the switching regulator.

12. The switching regulator as set forth in claim 10, wherein each level-shift means comprises a resistor.

13. The switching regulator as set forth in claim 10, wherein each level-shift means comprises a bipolar transistor operating in a saturation region.

14. The switching regulator as set forth in claim 11, wherein each level-shift means comprises a bipolar transistor operating in a saturation region.

15. The switching regulator as set forth in claim 9, wherein the first control means comprises:

triangular-wave generating means generating a triangular-wave voltage signal of a predetermined frequency; and first comparison means comparing the first control voltage with the triangular-wave voltage signal to output a primary switching pulse signal for operating the primary switch, the primary switching pulse signal having a pulse width equal to a period during which the first control voltage is smaller than the triangular-wave voltage signal.

16. The switching regulator as set forth in claim 15, wherein the second control means comprises:

second comparison means comparing the second control voltage with the triangular-wave voltage signal to output a switching pulse signal, the switching pulse signal having a pulse width equal to a period during which the second control voltage is smaller than the triangular-wave voltage signal; and inverting means inverting the switching pulse signal to output a flywheel switching pulse signal for switching the flywheel switching device.

17. The switching regulator as set forth in claim 16, wherein the second control means further comprising an electrically isolating circuit provided between the second comparison means and the inverting means.

18. A switching regulator comprising a primary switch and a synchronized-rectifying circuit operating in synchronization with a switching operation of the primary switch, the synchronized-rectifying circuit comprising a rectifying switching device and a flywheel switching device, the switching regulator further comprising:

control voltage generating means generating a first control voltage, a second control voltage lower than the first control voltage, and a third control voltage higher than the first control voltage, each control voltage varying in accordance with a DC output voltage of the switching regulator;

first control means controlling the switching operation of the primary switch based on the first control voltage such that the DC output voltage is kept constant;

second control means controlling a switching operation of the flywheel switching device based on the second control voltage such that switch-off timing of the flywheel switching device precedes switch-on timing of the primary switch and switch-on timing of the flywheel switching device follows switch-off timing of the primary switch by a period corresponding to the difference between the first and second control voltages; and third control means controlling a switching operation of the rectifying switching device based on the third control voltage such that switch-on timing of the rectifying switching device follows switch-on timing of the primary switch and switch-off timing of the rectifying switching device precedes switch-off timing of the primary switch by a period corresponding to the difference between the first and third control voltages.

19. The switching regulator as set forth in claim 18, wherein the control voltage generating means comprises:

variable-impedance means varying in impedance in accordance with the DC output voltage of the switching regulator; and three level-shift means connected in series, each level-shift means causing a voltage drop, and the three level-shift means being connected in series with the variable-impedance means.

20. The switching regulator as set forth in claim 19, wherein the variable-impedance means comprises:

a photodetector incorporated in a photocoupler; and third control means controlling a light quantity of a light-emitting element incorporated in the photocoupler in accordance with the DC output voltage of the switching regulator.

21. The switching regulator as set forth in claim 19, wherein each level-shift means comprises a resistor.

22. The switching regulator as set forth in claim 19, wherein each level-shift means comprises a bipolar transistor operating in a saturation region.

23. The switching regulator as set forth in claim 20, wherein each level-shift means comprises a bipolar transistor operating in a saturation region.

24. The switching regulator as set forth in claim 18, wherein the first control means comprises:

triangular-wave generating means generating a triangular-wave voltage signal of a predetermined frequency; and first comparison means comparing the first control voltage with the triangular-wave voltage signal to output a primary switching pulse signal for operating the primary switch, the primary switching pulse signal having a pulse width equal to a period during which the first control voltage is smaller than the triangular-wave voltage signal.

25. The switching regulator as set forth in claim 24, wherein the second control means comprises:

second comparison means comparing the second control voltage with the triangular-wave voltage signal to output a switching pulse signal, the switching pulse signal having a pulse width equal to a period during which the second control voltage is smaller than the triangular-wave voltage signal; and inverting means inverting the switching pulse signal to output a flywheel switching pulse signal for switching the flywheel switching device.

26. The switching regulator as set forth in claim 25, wherein the third control means comprises:

third comparison means comparing the third control voltage with the triangular-wave voltage signal to output a rectification switching pulse signal for operating the rectifying switching device, the rectification switching pulse signal having a pulse width equal to a period during which the third control voltage is smaller than the triangular-wave voltage signal.

27. The switching regulator as set forth in claim 26, wherein the second control means further comprising a first electrically isolating circuit provided between the second comparison means and the inverting means, and the third control means further comprising a second electrically isolating circuit through which the rectification switching pulse signal is transferred to the rectifying switching device.

28. A control method of a DC-DC converter comprising a transferring circuit transferring an electrical energy from a power supply to a load; a primary switch for performing a switching operation to supply the electrical energy to the transferring circuit; and a synchronized-rectifying circuit performing a switching operation to rectify an output of the transferring circuit in synchronization with the switching operation of the primary switch, the control method comprising the steps of:

generating a plurality of different control voltages in accordance with a DC output voltage of the DC-DC converter;

controlling the switching operation of the primary switch based on a single control voltage among the plurality of control voltages such that the DC output voltage is kept constant; and controlling the switching operation of the synchronized-rectifying circuit based on each of the other control voltages such that switching timing of the synchronized-rectifying circuit is deviated from that of the primary switch by a period corresponding to the difference between the single control voltage and each of the other control voltages.

29. The control method as set forth in claim 28, wherein the step of controlling the switching operation of the primary switch comprises the steps of:

generating a triangular-wave voltage signal of a predetermined frequency; and comparing the single control voltage with the triangular-wave voltage signal to output a switching pulse signal for operating the primary switch, the switching pulse signal having a pulse width equal to a period during which the single control voltage is smaller than the triangular-wave voltage signal.

30. The control method as set forth in claim 29, wherein the step of controlling the switching operation of the synchronized-rectifying circuit comprises the steps of:

comparing each of the other control voltages with the triangular-wave voltage signal to output a switching pulse signal for operating the synchronized-rectifying circuit, the switching pulse signal having a pulse width equal to a period during which each of the other control voltages is smaller than the triangular-wave voltage signal.

31. The switching regulator as set forth in claim 9, wherein the primary switch is an MOSFET.

32. The DC-DC converter as set forth in claim 8, wherein the second comparison means is a second comparator.

33. The DC-DC converter as set forth in claim 7, wherein the triangular-wave generating means is a triangular-wave generating means is a triangular-wave generator.

34. The DC-DC converter as set forth in claim 7, wherein the first comparison means is a first comparator.

35. The DC-DC converter as set forth in claim 1, wherein the transferring means is a transformer.

36. The DC-DC converter as set forth in claim 1, wherein the transferring means is a transformer and the switching means is a MOSFET connected to the primary of the transformer.

37. The DC-DC converter as set forth in claim 1, wherein the synchronized-rectifying means is a rectifying circuit.

\* \* \* \* \*